US011858778B2

(12) United States Patent
Studer et al.

(10) Patent No.: US 11,858,778 B2
(45) Date of Patent: Jan. 2, 2024

(54) METHOD FOR OPERATING A CONSTRUCTION SITE DEVICE AND CONSTRUCTION SITE DEVICE

(71) Applicant: Inventio AG, Hergiswil (CH)

(72) Inventors: Christian Studer, Kriens (CH); Gabriele Bizzozero, Gisikon (CH); Oliver Simmonds, Lucerne (CH); Stefan Weber, Niederwil (CH)

(73) Assignee: INVENTIO AG, Hergiswil (CH)

( * ) Notice: Subject to any disclaimer, the term of this patent is extended or adjusted under 35 U.S.C. 154(b) by 226 days.

(21) Appl. No.: 17/309,322

(22) PCT Filed: Dec. 13, 2019

(86) PCT No.: PCT/EP2019/085068

§ 371 (c)(1),
(2) Date: May 19, 2021

(87) PCT Pub. No.: WO2020/126904

PCT Pub. Date: Jun. 25, 2020

(65) Prior Publication Data

US 2022/0024727 A1 Jan. 27, 2022

(30) Foreign Application Priority Data

Dec. 18, 2018 (EP) .................................... 18213788
Dec. 24, 2018 (EP) .................................... 18215825

(51) Int. Cl.

| | |
|---|---|
| ***B66B 19/00*** | (2006.01) |
| ***B66B 1/34*** | (2006.01) |
| ***B66B 9/00*** | (2006.01) |

(52) U.S. Cl.
CPC ............ *B66B 19/00* (2013.01); *B66B 1/3492* (2013.01); *B66B 9/00* (2013.01)

(58) Field of Classification Search
CPC ........ B66B 9/187; B66B 19/005; B66B 19/00
See application file for complete search history.

(56) References Cited

U.S. PATENT DOCUMENTS 10,023,435 B2 7/2018 Taylor
11,208,296 B2 * 12/2021 Christen ............... B66B 19/002

FOREIGN PATENT DOCUMENTS

CN 105297639 A 2/2016
CN 207296386 U 5/2018

(Continued)

*Primary Examiner* — Diem M Tran
(74) *Attorney, Agent, or Firm* — William J. Clemens; Shumaker, Loop & Kendrick, LLP

(57) ABSTRACT

A method and construction site device for vertical transportation during a building construction phase include a climbing formwork platform arranged in a currently uppermost region of the building for concreting at least part of the building core, an elevator car intermittently adjusted to a current building height in a first elevator shaft by hoisting a mechanical platform to a higher level and fixing it there, a construction elevator temporarily installed in a second elevator shaft and attached to the climbing formwork platform with a construction elevator car vertically movable in a construction elevator frame, and wherein people and/or material are transported to a floor associated with an access opening of the construction elevator by the elevator system and then are transported from this floor to a floor situated in the currently uppermost region of the building or to the climbing formwork platform by the construction elevator.

17 Claims, 1 Drawing Sheet

(56) References Cited

FOREIGN PATENT DOCUMENTS

| | | | | | |
|---|---|---|---|---|---|
| CN | 207513158 | U | * | 6/2018 | ............. E04G 11/22 |
| CN | 108367897 | A | | 8/2018 | |
| CN | 208037786 | U | | 11/2018 | |
| EP | 3725726 | A1 | * | 10/2020 | |
| GB | 2217296 | A | | 10/1989 | |
| JP | 2012206856 | A | | 10/2012 | |
| WO | 2017102684 | A1 | | 6/2017 | |
| WO | WO-2020126906 | A1 | * | 6/2020 | ........... B66B 11/008 |

* cited by examiner

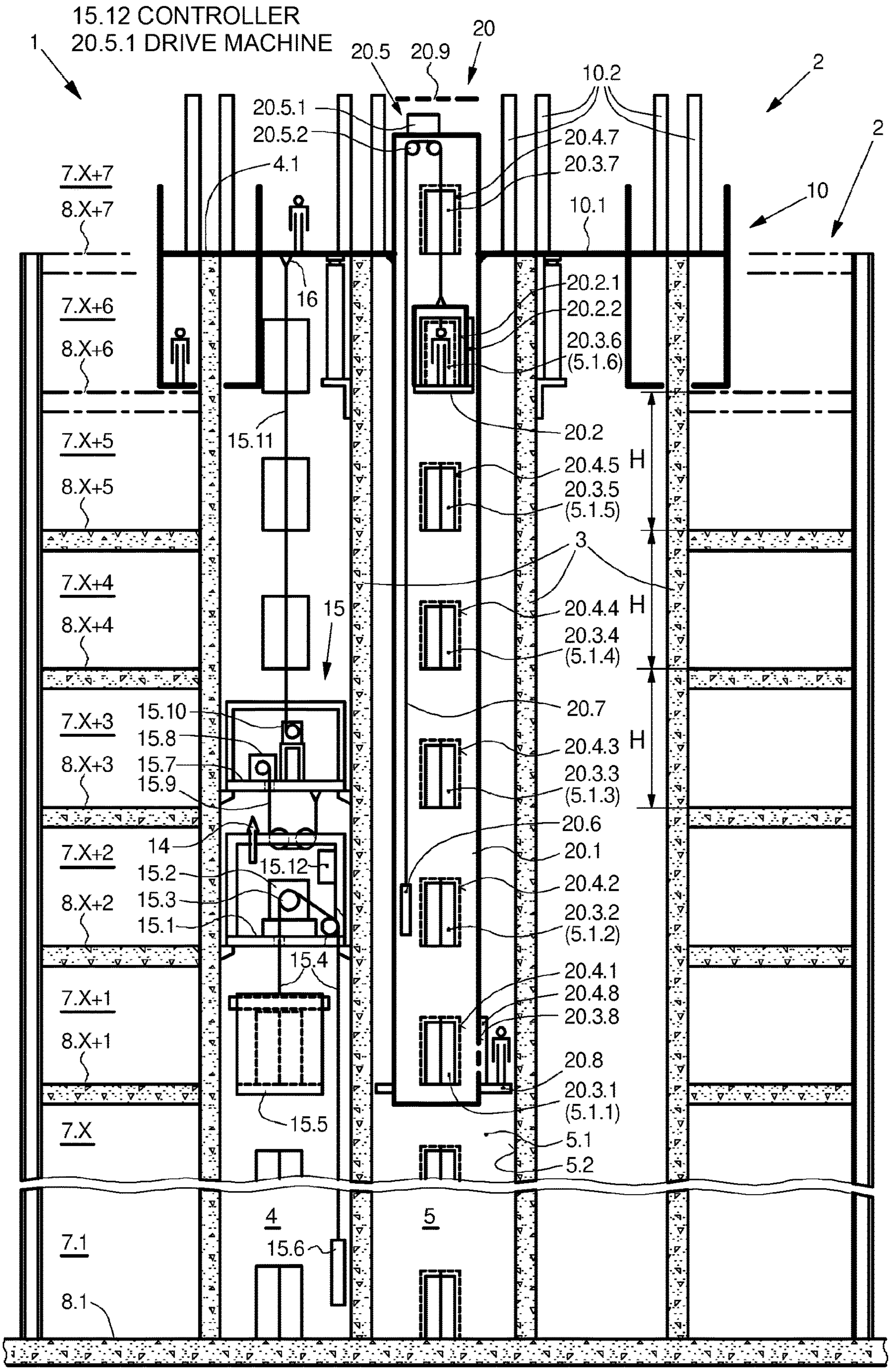
15.12 CONTROLLER
20.5.1 DRIVE MACHINE
1
20
20.5
20.9
10.2
2
20.5.1
20.5.2
20.4.7
20.3.7
4.1
10
10.1
7.X+7
8.X+7
7.X+6
8.X+6
16
20.2.1
20.2.2
20.3.6
(5.1.6)
20.2
7.X+5
8.X+5
15.11
20.4.5
20.3.5
(5.1.5)
H
3
7.X+4
8.X+4
15
20.4.4
20.3.4
(5.1.4)
20.7
7.X+3
8.X+3
15.10
15.8
15.7
15.9
20.4.3
20.3.3
(5.1.3)
20.6
14
7.X+2
8.X+2
15.12
15.2
15.3
15.1
20.1
20.4.2
20.3.2
(5.1.2)
15.4
7.X+1
8.X+1
20.4.1
20.4.8
20.3.8
20.8
20.3.1
(5.1.1)
15.5
7.X
5.1
5.2
4
5
7.1
15.6
8.1

METHOD FOR OPERATING A CONSTRUCTION SITE DEVICE AND CONSTRUCTION SITE DEVICE

FIELD

The invention relates to a method for operating a construction site device, in particular a method for transporting people and/or material in a building which is in its construction phase, which building is at least partially constructed with the aid of a climbing formwork device. The invention also relates to a construction site device suitable for carrying out the method mentioned.

BACKGROUND

Climbing formwork devices are a type of formwork system which works discontinuously, and are used in the production of tower-like components/structures. They can be used, for example, to produce vertical walls of a high-rise core in the form of successively concreted sections lying one above the other, i.e. the climbing formwork device and thus the formwork walls are usually raised by a suitable distance after each concreting process. So-called self-climbing formwork devices are offered with permanently integrated climbing drives. Climbing formwork devices can also include climbing formwork platforms, which are used in the construction of high-rise cores and which carry the entire interior and exterior formwork for several walls of the building core.

In a known practice, during the construction phase of a relatively tall building in its construction phase, an elevator system is installed in an elevator shaft which grows with the height of the building, which elevator system can be adjusted to the current height of the building, and which serves to convey construction personnel and material, as well as to provide access to floors of the building which have already been completed. The usable conveying height of such an elevator system is adjusted from time to time to the increasing building height. Normally, essential parts of such an elevator system remain permanently in the building after the building has been completed. Such an elevator system which is able to be adjusted to the building height usually has a mechanical platform with a drive machine, which can be temporarily fixed in the assigned elevator shaft, wherein the mechanical platform and the drive machine support and drive the elevator car and the counterweight of the elevator system. Above the mechanical platform, a hoisting platform that is vertically displaceable and temporarily fixable in the elevator shaft is usually installed with a hoisting device, which is used to gradually raise the mechanical platform and the elevator car suspended from it. To protect the people assembling the elevator system and the components of the elevator system from falling objects, a protective platform is usually attached above the hoisting platform, which is also gradually raised in the elevator shaft and also serves as a support for a device for raising said hoisting platform in steps. Since both the mechanical platform, and also the hoisting platform and the protection platform, of the elevator system, able to be adjusted to the building height in the existing elevator shaft, take up a relatively large space above the highest car position that can be reached by the elevator car, and since the usable conveying height of the elevator system is usually only adjusted once more when the building has grown by the height of several floors since the last adaptation, the top floor level which can be reached by the elevator car of the elevator system able to be adjusted to the building height may temporarily be up to 30 m below the highest working level of the construction site—for example, below a climbing formwork device arranged for concreting the core structure of the building at its top end, or below a climbing formwork platform of such a climbing formwork device.

To bridge the vertical distance between the uppermost floor level that can be reached by the elevator car of the elevator system able to be adjusted to the building height and the uppermost workplaces of the growing building, a staircase can be attached to the climbing formwork platform below the climbing formwork platform of a climbing formwork device. However, access from the top stop of the elevator system able to be adjusted to the height of the building, via a staircase, to the climbing formwork platform is very strenuous and time-consuming for the construction personnel, and the transport of material and tools via such a staircase is practically impossible.

From JP 2012 206856 A, it is known to lower an indoor construction elevator, which is used as a means of transport when carrying out work on the uppermost floors, as a preassembled unit through recesses in the floor into the building in an upper region of a building in its construction phase, and to fix it to at least one floor. The indoor construction elevator extends over roughly the top 6 to 10 floors and is designed as a preassembled unit which comprises a construction elevator frame forming an elevator shaft, with integrated guide rails, an elevator car with a car door that can be moved vertically on the guide rails, and an elevator drive. In addition, the construction elevator frame is provided on its vertical outer sides with panels that form a shaft wall and have shaft doors. Furthermore, from JP 2012 206856 A, it is known to use the indoor construction elevator to transport people and material from the lower region of the building to the uppermost region of the building. For this purpose, on the one hand, an outdoor construction elevator is arranged on an outer wall of the building, wherein the construction elevator car thereof, due to the scaffolding arranged above the outdoor construction elevator, can only reach a floor level that is a few floor heights below the floor level of the current top floor, but at least above a floor level assigned to the lowest shaft doors of the indoor construction elevator. In a first step, people and/or material are then transported with the outdoor construction elevator to a floor in the region of the indoor construction elevator, and then with the indoor construction elevator to the destination floor.

The method known from JP 2012 206856 A has in particular the disadvantages that it is not designed to work together with a climbing formwork device, and that, with increasing height of the building, from time to time, the indoor construction elevator must be hoisted and re-fixed with the help of a crane, and the guide frame of the outdoor construction elevator has to be extended upwards. In addition, the system according to the method cannot be used to transport people in a lower region of a high-rise building that can already be used during the construction phase.

From GB 2 217 296 A, an elevator system is known which serves as a transport device for people and material when erecting tall buildings, preferably when erecting with the aid of a climbing formwork device. The elevator system comprises at least one elevator with a machine room comprising an elevator drive, and an elevator car carried and driven by the elevator drive via supporting cables. The elevator can be adjusted to an increasing building height in that its machine room can be raised in accordance with an increasing building height, and the conveying height of its elevator car can be raised accordingly. The machine room is not—as is well known—arranged to enable hoisting to the uppermost region of the elevator shaft that has already been constructed, but rather a few meters above the currently uppermost region of the elevator shaft, supported on it, and can be raised each time by one floor height by means of hoisting devices. If the building is constructed with the help of a climbing formwork device, the machine room is arranged above the climbing formwork device and is supported on it. Each time the climbing formwork device is raised by one floor height, the machine room is also automatically raised. The described arrangements of the machine room have the advantage that the elevator car can always also reach the uppermost region of the elevator shaft that has just been completed, and the uppermost floors corresponding to it.

The method known from GB 2 217 296 A has the particular disadvantages that the weight of the jump lifts and their mechanical platforms cannot be supported directly on the walls of the elevator shafts, but rather rests on long piston rods of hydraulic cylinders. The main disadvantage, however, is to be seen in the fact that the construction work on the climbing formwork device is severely hindered by the machine rooms arranged above the climbing formwork device.

SUMMARY

The invention is based on the object of specifying a method and a device which are suitable for realizing the vertical transport of people and material in a building that is in its construction phase, the building core of which is concreted with the help of a climbing formwork device. In particular, the transport of construction personnel and material to one of the currently-top floors, and also to a climbing formwork platform of the climbing formwork device currently installed in the topmost region of the building, should be able to be carried out conveniently, inexpensively and in a time-saving manner, without the device required to carry out the method hindering work on the climbing formwork device.

On the one hand, this task is solved by the use of a method for the vertical transportation of people and/or material in a building in its construction phase, in which method a climbing formwork device, comprising a climbing formwork platform and able to be hoisted in steps, is arranged in a currently uppermost region of the building and is used to concrete at least part of a building core of the building, wherein an elevator system, able to be adjusted to an increasing building height and having an elevator car, is installed in a first elevator shaft of the building, wherein a conveying height of this elevator system is intermittently adjusted to a current building height primarily by hoisting a mechanical platform comprising an elevator drive machine to a higher level and fixing it there, wherein at least the two currently uppermost floors are however not able to be reached by the elevator car, wherein a construction elevator is temporarily installed in a second elevator shaft in a currently uppermost region of the building and is attached to the climbing formwork platform of the climbing formwork device, wherein the construction elevator comprises at least one construction elevator frame, a construction elevator car able to be moved vertically in the construction elevator frame, and at least two access openings arranged in the construction elevator frame and corresponding to shaft door clearances in a shaft wall of the second elevator shaft, and wherein people and/or material, in a first step, are transported to a floor associated with one of the access openings of the construction elevator by the elevator system able to be adjusted to the building height and, in a second step, are transported from this floor to a floor situated in the currently uppermost region of the building or to the climbing formwork platform by the construction elevator.

On the other hand, the task is solved by a construction site device suitable for carrying out the above-mentioned method, comprising a building in its construction phase with a number of floors that have already been constructed and with at least one first elevator shaft that extends up to a current building height, a climbing formwork device, comprising a climbing formwork platform which is able to be hoisted in steps and is arranged in a currently uppermost region of the building, used to concrete at least part of a building core of the building, an elevator system installed in a first elevator shaft of the building, which is able to be adjusted to an increasing building height and which can be used as early as during the construction phase to transport people and/or material in the region of the floors that have already been built, and includes an elevator car the conveying height of which can be intermittently adjusted to a current building height primarily by upward displacement of a mechanical platform comprising an elevator drive machine, wherein, however, at least the two uppermost floors are not currently accessible for the elevator car, wherein a construction elevator is temporarily installed in a second elevator shaft of the building, the construction elevator frame forming an elevator shaft of the construction elevator, a construction elevator car which can move vertically in the construction elevator frame, and which comprises access openings corresponding to at least two shaft door clearances in a shaft wall of the second elevator shaft, wherein the construction elevator frame extends far enough below the climbing formwork platform so that a floor level currently corresponding to the lowest access opening of the construction elevator can be reached through the elevator car of the elevator system able to be adjusted to the increasing building height, if its mechanical platform is positioned at a maximum intended vertical distance from the climbing formwork platform or from the current upper end of the building core, wherein the construction elevator is fixed on the climbing formwork platform of the climbing formwork device, and wherein people and/or material can be transported in a first step to a floor level assigned to one of the access openings of the construction elevator, with the elevator system able to be adjusted to a building height, and can be transported in a second step from this floor level to a floor level situated in the currently uppermost region of the building, or to the climbing formwork platform of the climbing formwork device, with the construction elevator.

In this document, the adjective “current” characterizes sizes, conditions, positions, etc. that occur during the construction of the building and that do not relate to the completed building.

The second elevator shaft does not necessarily have to be an elevator shaft that is separate from the first elevator shaft; rather, the second elevator shaft can also be part of a first elevator shaft designed as a multiple shaft.

The advantages of using the method according to the invention or the use of a construction site device according to the invention are, on the one hand, that construction personnel, material or tools can be easily and quickly transported, starting from below an uppermost region of the a building in its construction phase, to an uppermost region of the building provided with a climbing formwork platform, by means of an elevator system which is able to be adjusted to the building height, and an additional construction elevator, even if the currently uppermost region cannot be reached by the elevator system which is able to be adjusted to the building height, wherein the construction site device does not hinder work on the climbing formwork platform of the climbing formwork device.

In one of the possible embodiments of the method, the climbing formwork device, which includes the climbing formwork platform and which can be raised in steps, is raised each time by one floor, i.e. by a whole floor height. This ensures that, in the normal case, i.e. when successive floors have the same floor heights, after each lifting of the climbing formwork device and thus of the construction elevator attached to it, the levels of the access openings of the construction elevator correspond to one floor level in each case.

In a further possible embodiment of the method, the elevator system able to be adjusted to an increasing building height is already used during the construction phase of the building to transport people and/or material in the part of the building with already inhabited or commercially used floors, and after completion of the building, significant portions thereof are permanently left in the building as an elevator system. This greatly reduces the costs for the means of transport required during the construction phase.

In a further possible embodiment of the method, the construction elevator frame of the construction elevator is designed in such a way that it extends at least over an entire conveying height of the construction elevator car and has at least two access openings, wherein guides for guiding the construction elevator car are mounted in the construction elevator frame, wherein a construction elevator car equipped with a first car door is installed in the construction elevator frame in such a way that the construction elevator car can be displaced along the guides, wherein a drive device for raising and lowering the construction elevator car is installed in and/or on the construction elevator frame, and wherein shaft doors for closing and opening the access openings are attached to the construction elevator frame. The advantage of such a construction elevator frame is that it is equipped with the shaft doors required for safety, such that no shaft doors have to be attached to the elevator shaft of the building in the region of the last floors built.

In a further possible embodiment of the method, a part of the construction elevator located below the climbing formwork platform is designed to be at least high enough that a floor currently assigned to a lowest access opening of the construction elevator can be reached by the elevator car of the elevator system able to be adjusted to the increasing building height if its mechanical platform is temporarily positioned at a maximum intended vertical distance below the climbing formwork platform. In this way, the functionality of the method can be guaranteed with the least possible effort for the construction elevator if different procedures are used in which a different number of additional floors is created between two adjustments of the conveying height of the elevator system which is able to be adjusted to the increasing building height.

In a further possible embodiment of the method, the construction elevator is designed in such a way that its construction elevator car has a maximum conveying height which corresponds to at least four times and at most ten times an average floor height of the building.

With a dimensioning of the construction elevator correctly selected from the specified range, it is ensured that the elevator car of the elevator system able to be adjusted to a building height can reach a floor level of the construction elevator with an associated access opening in every planned situation.

In a further possible embodiment of the method, the construction elevator is delivered to the construction site as a unit preassembled in the manufacturing plant, lowered into the second elevator shaft by means of a hoisting device, and attached to the climbing formwork platform of the climbing formwork device.

This means that with the least possible installation effort, people and material can be transported in the entire upper region of the building currently in its construction phase, wherein the construction elevator always automatically undertakes to hoist the climbing formwork unit before the start of a floor-by-floor concreting process, due to its attachment to the climbing formwork platform of the climbing formwork device.

In a further possible embodiment of the method, further access openings with assigned shaft doors are arranged on the construction elevator frame between the uppermost and the lowermost access opening. This ensures that several floors in the region of the construction elevator and thus also the working scaffolding of the climbing formwork device can be reached with the construction elevator.

In a further possible embodiment of the method, the construction elevator is attached to the climbing formwork platform of the climbing formwork device in such a way that in the uppermost region of the construction elevator frame, an uppermost access opening and an uppermost shaft door protrude above the climbing formwork platform. This has the advantage that people and material can be transported directly to the climbing formwork platform of the climbing formwork device, starting from below an uppermost region of the building in its construction phase by the construction elevator, without having to use a staircase.

In a further possible embodiment of the method, the construction elevator is attached to the climbing formwork platform of the climbing formwork device in such a way that the entire construction elevator frame with an uppermost access opening and an uppermost shaft door are below the climbing formwork platform of the climbing formwork platform. This embodiment has the advantage that the construction elevator does not have any components protruding beyond the climbing formwork platform of the climbing formwork device, such that neither the construction elevator nor its users are endangered by the movements of objects on or above the climbing formwork platform.

In a further possible embodiment of the method, the access openings and the associated shaft doors are arranged on the construction elevator frame in such a way that the levels of door sills of shaft doors arranged below the climbing formwork platform correspond to a floor level of an already constructed floor when the climbing formwork device is in one of the locking positions, in each of which a further wall section of the building core is concreted, wherein the heights of the wall sections correspond to the floor height. Such an embodiment can take advantage of the fact that when concreting walls with the aid of a climbing formwork device, the climbing formwork device is raised floor by floor before each new concreting process, and is put into a locking position during the concreting process. During the concreting process, i.e. while the climbing formwork device and thus also the construction elevator remain in their locking position, the construction elevator can be used for transport operations.

In a further possible embodiment of the method, at least one of the access openings and each of the assigned shaft doors are arranged vertically on the construction elevator frame, such that the vertical positions of the at least one access opening and the assigned shaft door can be adjusted to different floor heights or to different distances between floor levels. With at least one vertically displaceable access opening and at least one associated, vertically displaceable shaft door, the construction elevator can also be used for transport if the construction elevator is positioned in a region of a floor that has a floor height that deviates from the floor heights of the other floors—for example, if the building comprises one or more intermediate lobbies with a floor height that is greater than that of the other floors.

In a further possible embodiment of the method, the construction elevator is arranged in the second elevator shaft in such a way that a first side of the construction elevator, which is assigned to a first car door of the construction elevator car and is provided with a shaft door, lies parallel and as close as possible to a first inner wall of the second elevator shaft containing shaft door clearances, such that between a second side of the construction elevator that is not assigned to the first car door and an inner wall of the second elevator shaft parallel to this second side there is at least about 0.5 meters of space, wherein a second car door can be attached to the construction elevator car parallel to the second side of the construction elevator, and an access opening corresponding to the second car door, with the associated shaft door, can be attached to the construction elevator frame, and wherein, at the level of a door sill of the at least one shaft door corresponding to the second car door, in the space available between the second side of the construction elevator and the inner wall of the second elevator shaft parallel thereto, a walkable, horizontal platform is attached to the construction elevator frame of the construction elevator, via which platform access to the interior of the second elevator shaft is made possible for the construction elevator. Such a further development of the method enables construction specialists or elevator installers to also reach the inside of the elevator shaft in which the construction elevator is installed, for example in order to complete shaft walls there or in order to install components of an elevator that will be installed later and that will remain in the building in the elevator shaft.

In a further possible embodiment of the method, information about the current vertical position of the construction elevator coupled to the climbing formwork platform is transmitted to a controller of the elevator system which is able to be adjusted to the building height, and this information is evaluated by said controller to determine a transfer floor that is used by both the elevator car of the elevator system able to be adjusted to the building height and the construction elevator car, as a transfer stop for changing between the elevator system able to be adjusted to the building height and the construction elevator. This ensures that people who wish to use the elevator system able to be adjusted to the building height, as well as the construction elevator, to get to the topmost region of the building, or from there to one of the lowest floors, can simply select the desired final destination floor as the destination floor for elevator car of the elevator system which is able to be adjusted to the building height or for the construction elevator car. The current vertical position of the construction elevator coupled to the climbing formwork platform, and thus the current vertical position of the access opening of the construction elevator, are not relevant for a destination input by the elevator user.

In a further possible embodiment of the construction elevator, the part of the construction elevator frame of the construction elevator that protrudes beyond the climbing formwork platform of the climbing formwork platform is provided with an impact-resistant and watertight protective hood. This ensures on the one hand that the construction elevator cannot be damaged by falling objects, and on the other hand the protective hood sealed against the climbing formwork platform prevents rainwater from penetrating into the construction elevator as well as into the elevator shaft assigned to the construction elevator.

DESCRIPTION OF THE DRAWINGS

An embodiment of the invention is explained below with reference to FIG. 1. FIG. 1 shows a vertical section through a construction site device, having a climbing formwork device comprising a climbing formwork platform, a construction elevator fixed to the climbing formwork device, and an elevator system which is able to be adjusted to the building height.

DETAILED DESCRIPTION

FIG. 1 shows a schematic representation of a construction site device 1 within a building 2 which is in its construction phase. A building core 3 of the building, which is to be constructed from concrete and has already reached a certain initial height, is shown. The building core comprises a first elevator shaft 4 and a second elevator shaft 5 adjacent and parallel to it, wherein two living or office areas adjoining the elevator shafts and comprising several floors 7.1-7.X+5 are indicated starting from a floor level 8.1.

Here and in the following, the letter "X" stands for an indefinite number of floors below the building region shown.

The building core 3 is created using a known climbing formwork technique. A climbing formwork device 10 which comprises a climbing formwork platform 10.1 is installed in the currently uppermost region of the building 2 which is in its construction phase. The climbing formwork platform 10.1 extends over the entire region of the building core 3 and supports formwork walls 10.2 above its climbing formwork platform 10.1. In order to be able to produce a further section of the concrete walls forming the building core 3, the climbing formwork platform 10.1 with the formwork walls 10.2 is gradually raised, with a corresponding amount of concrete and reinforcement mesh being placed between the formwork walls 10.2 after each raising.

In order to be able to transport construction personnel, building materials or tools as effortlessly and in the most time-saving manner possible to the emerging floors and the uppermost region of the building 2 or the building core, an elevator system 15 which is able to be adjusted to the building height is installed in the first elevator shaft 4. This elevator system 15 comprises a mechanical platform 15.1 with an elevator drive machine 15.2, wherein the elevator drive machine carries and drives suspension cables 15.4 via a traction sheave 15.3, with which suspension cables an elevator car 15.5 and a counterweight 15.6 are suspended from the mechanical platform 15.1 and are moved up and down. The mechanical platform 15.1 can be raised in steps in a known manner—which is indicated in FIG. 1 by the arrow 14—and can be temporarily fixed at a higher level in the first elevator shaft 4, such that the conveying height of the elevator system 15 and/or the elevator car 15.5 can be gradually adjusted to an increasing height of the building 2 and/or of the building core 3, by also lengthening the supporting cables 15.4 accordingly. A so-called hoisting platform 15.7, which can be temporarily fixed above the mechanical platform in the first elevator shaft 4 and which comprises a first hoist 15.8 with which the mechanical platform 15.1 can be raised via a first traction means 15.9, is used to raise the mechanical platform 15.1. After such a hoisting process, the mechanical platform 15.1 is fixed again in the first elevator shaft 4, such that the elevator system 15 is ready for operation again with an increased usable conveying height after its suspension cables 15.4 have been extended. The hoisting platform 15.7 is raised to a higher level in each case before the mechanical platform 15.1 is raised. For this purpose, a second hoist 15.10 can be attached to the hoisting platform, which generates the required hoisting force via a second traction means 15.11 fastened to a fixed point 16 present in the elevator shaft.

During the construction phase of the building 2, the elevator system 15 able to be adjusted to an increasing building height serves on the one hand to transport construction personnel and building material to work sites on all floors 7.1-7.X+7 of the building that are already accessible, and on the climbing formwork platform 10.1 of the climbing formwork device 10. On the other hand, during the construction phase, the elevator system 15 transports both users of lower floors 7.1-7.X that are already inhabited or commercially used, as well as furniture and other objects belonging to these users. After completion of the construction phase and after carrying out certain modifications to the elevator system 15—for example, dismantling the hoisting platform 15.7 and finally fixing the mechanical platform 15.1 in the shaft head of the first elevator shaft 4—the elevator system 15 able to be adjusted to the increasing building height can continue to a substantial extent to be used permanently as a normal passenger elevator and/or goods elevator in the same elevator shaft 4.

The use of the elevator system 15 able to be adjusted to the increasing height of the building to transport people and material to the floors 7.X+3-7.X+7 that have already been built or are in the process of being built in the uppermost region of the building leads to the problem that the elevator car 15.5 of this elevator system 15, which is arranged completely in the region of the currently existing height of the first elevator shaft 4, is not able to travel up to an uppermost shaft region, which can be up to thirty meters high, and therefore in particular cannot transport the construction personnel into the region of the climbing formwork platform 10.1. The cause of this problem is on the one hand that the mechanical platform 15.1 is arranged above the elevator car 15.5, the hoisting platform 15.7 above the mechanical platform, and a device for lifting the hoisting platform and parts of the climbing formwork device 10 are arranged above the hoisting platform, wherein these components are all below the currently uppermost shaft end 4.1 of the first elevator shaft 4. On the other hand, the conveying height of the elevator system 15, able to be adjusted to an increasing height of the building 2 or the building core 3, is not adjusted every time after a new floor has been created, since such an adjustment is associated with a relatively high amount of work. Usually, the conveying height is not adjusted until three to six new floors have been built since the last adjustment. FIG. 1 shows the elevator system 15 in a situation in which two additional floors have been created since the last adjustment of the conveying height, such that both the hoisting platform 15.7 and the mechanical platform 15.1 and the elevator car 15.5 attached to it could be shifted upwards by two floor heights H in the first elevator shaft 4.

The above-described problem, that a comparatively high uppermost shaft region cannot be reached by the elevator car 15.5 of the elevator system 15 able to be adjusted to the increasing building height, is remedied according to the invention by using a construction elevator 20 cooperating with the mentioned elevator system 15. This construction elevator 20 is preferably installed in the currently uppermost shaft region of a second elevator shaft 5 which is as close as possible to the first elevator shaft 4. This second elevator shaft 5 grows upwards during the construction phase of the building together with the climbing formwork device 10 and with further walls of the building core 3, wherein a first shaft wall 5.1 of the second elevator shaft 5 has been provided with shaft door clearances 5.1.1-5.1.6 during the incremental construction of the building core, wherein the sill level thereof matches the corresponding floor level. The construction elevator 20 can extend in the vertical direction over five to ten floors of the building 2. Of course, the construction elevator 20 could also be installed in the first elevator shaft 4, if it is a so-called multiple elevator shaft. The construction elevator 20 is dimensioned in such a way that a construction elevator car 20.2 of the construction elevator can be moved between a floor level 8.X+7, 8X+6 lying above or below the climbing formwork platform 10.1 of the climbing formwork device 10 and at least the floor level 8.X+1 that can be reached as intended by the elevator car of the elevator system 15 able to be adjusted to the building height.

The construction elevator 20 comprises a self-supporting construction elevator frame 20.1 which extends substantially over the entire conveying height of the construction elevator and which is preferably constructed from steel profiles. Inside this construction elevator frame 20.1, guide rails—not shown in FIG. 1—for guiding a construction elevator car 20.2 are installed. The four vertical inner sides of the construction elevator frame are covered with wall panels—also not shown—that form flat and smooth shaft walls for the construction elevator. In one of the side walls of the construction elevator frame 20.1 and in the wall panels belonging to this, at least two access openings 20.3.1-20.3.7 arranged one above the other are recessed, the position of which in the installed state of the construction elevator corresponds to the position of each of the assigned shaft door clearances 5.1.1-5.1.6 in a first shaft wall 5.1 of the second elevator shaft 5. In the region of the construction elevator, these access openings 20.3.1-20.3.7 can be closed with shaft doors 20.4.1-20.4.7 fastened to the construction elevator frame 20.1. Furthermore, a construction elevator car 20.2 which is guided and movable along guide rails and which is equipped with at least one first car door 20.2.1 is integrated into the construction elevator frame 20.1. For moving the construction elevator car 20.2 within the construction elevator frame 20.1, a drive device 20.5 is attached to the construction elevator frame. In FIG. 1, the drive device 20.5 comprises a drive machine 20.5.1 with a drive pulley 20.5.2, wherein the drive pulley carries and drives a suspension cable 20.7 which carries and drives the construction elevator car 20.2 and a counterweight 20.6. The drive device 20.5 could, however, also be present in the form of a cable winch that winds and unwinds a support cable, or in the form of hydraulic cylinders.

The construction elevator 20 or the construction elevator frame 20.1 of the construction elevator is preferably fixed to the climbing formwork platform 10.1 in such a way that an upper part of the construction elevator frame 20.1 protrudes beyond the climbing formwork platform 10.1 of the climbing formwork device 10, wherein an uppermost access opening 20.3.7 with an associated shaft door 20.4.7 is attached to this upper part, via which the construction personnel can reach the climbing formwork platform 10.1 with the construction elevator 20.

In an alternative embodiment, the construction elevator 20 can also be fixed completely below the climbing formwork platform 10.1 to the same, such that it does not protrude beyond the climbing formwork platform 10.1 of the climbing formwork device 10. In this embodiment, construction personnel who want to get to the climbing formwork platform 10.1 of the climbing formwork device 10 must use a staircase which spans a floor height H, in addition to the construction elevator 20.

In order to be able to comfortably reach work sites at all levels in the region of the construction elevator 20, the construction elevator frame 20.1 can have several additional access openings 20.3.2-20.3.5 with associated shaft doors 20.4.2-20.4.5, in addition to the at least two access openings mentioned. At least the lowermost access opening 20.3.1 with its shaft door 20.4.1 can be designed to be vertically displaceable in order to be able to adjust its sill level to the floor level of currently corresponding floors—for example if, as an exception, a floor with a different floor height is built between floors with a uniform floor height.

The construction elevator 20 is attached to the climbing formwork platform 10.1, such that it always remains positioned in the currently uppermost region of its elevator shaft 5 during the entire construction phase of the building 2, without a hoisting device for lifting the construction elevator being required in the building 2. The construction elevator 20 is fixed in the vertical direction on the climbing formwork platform 10.1, such that the sill levels of its access openings 20.3.1-20.3.6 match the corresponding floor levels 8.X+1-8.X+6 when the climbing formwork device 10 remains in a locking position after a hoisting process. In each of these positions, concrete is introduced between the formwork walls 10.2 in order to raise the walls of the building core 3 by a further section. To ensure that the sill levels of the access openings 20.3.1-20.3.7 and the corresponding floor levels 8.X+1-8.X+7 match during the concreting process, the climbing formwork device 10 with the formwork walls 10.2 attached to it and with the construction elevator 20 must be raised by an entire floor height H between each concreting process. In other words, the walls of the building core 3 must be raised by a section corresponding to an entire floor height H with each concreting process. In addition, the vertical distances between the access openings of the construction elevator must also correspond to the floor height H.

The building 2 can, however, have intermediate floors, the floor height of which deviates from the floor height H of the majority of all floors, such that the climbing formwork device 10 must exceptionally be raised by a distance that deviates from that of the floor height H of the majority of all floors. In order to be able to guarantee the functionality of the construction elevator and thus the entire transport concept in such a situation, the connection between the climbing formwork platform 10.1 and the construction elevator 20 can be designed to be preferably displaceable or adjustable by about one meter. In addition, one or more of the access openings 20.3.1-20.3.7 can be attached to the construction elevator frame 20.1 so as to be vertically displaceable for the same purpose.

In order to get from one of the lower floors 7.1-7.X to one of the floors 7.X+2-7.X+7 currently in the uppermost region of building 2, the users first travel with the elevator system 15 able to be adjusted to the building height to a floor (according to FIG. 1: currently 7.X+1) wherein the floor level 8.X+1 thereof corresponds to the current floor level of the lowest access opening 20.3.1 of the construction elevator 20. The users then change elevators by walking over the above-mentioned floor to the construction elevator car 20.2 of the construction elevator 20 in order to reach this construction elevator car to also access the currently highest floors 7.X+2-7.X+7 in building 2, and in particular also the climbing formwork platform 10.1 of the climbing formwork device 10. Corresponding elevator trips are of course also possible in the opposite direction.

In the borderline situation shown in FIG. 1, the floor level 8.X+1 of the floor 7.X+1 is at the limit of what can be reached both for the elevator car 15.5 of the elevator system 15 able to be adjusted to an increasing height of the building, and for the construction elevator car 20.2 of the construction elevator 20, such that transfers using the elevator system 15 and the construction elevator 20 are possible.

The construction elevator car 20.2 of the construction elevator 20 can have a first car door 20.2.1 oriented towards the first shaft wall 5.1 with the shaft door clearances 5.1.1-5.1.6 and a second car door 20.2.2 arranged in another wall of the construction elevator car orientated toward a second shaft wall 5.2, wherein at least one access opening 20.3.8 corresponding to the second car door 20.2.2, with a shaft door 20.4.8, is attached to the construction elevator frame 20.1, and wherein, below the access opening 20.3.8 of the construction elevator 20 corresponding to the second car door 20.2.2, a walkable platform 20.8 is attached to the construction elevator frame 20.1, which enables a user of the construction elevator to get from the construction elevator car 20.2 to the interior of the second elevator shaft 5 in order to carry out work there. Such walkable platforms 20.8 are preferably attached at the level of several of the access openings 20.3.1-20.3.6 of the construction elevator frame 20.1.

In order to make the transfer process from the elevator system 15 able to be adjusted to the building height to the construction elevator 20 as optimal as possible, information about the current vertical position of the construction elevator 20 fixed on the climbing formwork platform 10.1 is transmitted to a controller 15.12 of the elevator system 15 which is able to be adjusted to the building height. This information is used by the mentioned control to determine the target position of the elevator car 15.5 of the elevator system 15 able to be adjusted to the building height, for a transfer stop, which expediently takes place in the region of the lowest access opening 20.3.1 of the construction elevator 20.

Above the construction elevator 20, the construction elevator frame 20.1 of the construction elevator 20 protruding beyond the climbing formwork platform 10.1 of the climbing formwork device 10 is provided with an impact-resistant protective hood 20.9, which is preferably watertight and sealed against the climbing formwork platform 10.1. This ensures, on the one hand, that the entire construction elevator 20 cannot be damaged by falling objects, and on the other hand the protective hood sealed against the climbing formwork platform 10.1 prevents rainwater from penetrating both into the construction elevator 20 and into the elevator shaft 5 assigned to the construction elevator. If the construction elevator is arranged below the climbing formwork platform 10.1, a protective platform can be attached directly to the climbing formwork platform to protect the components of the construction elevator from falling objects originating from the construction operation.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method for vertical transportation of people and/or material in a building during a construction phase of the building, the method comprising the steps of:

arranging a climbing formwork device in a currently uppermost region of the building to concrete at least part of a building core of the building, the climbing formwork device including a climbing formwork platform and being adapted to be hoisted in steps;

installing an elevator system in a first elevator shaft of the building, the elevator system adapted to adjust to an increasing building height and having an elevator car, wherein a conveying height of the elevator system is intermittently adjusted to a current building height by hoisting a mechanical platform including an elevator drive machine to a higher level and fixing the mechanical platform in the first elevator shaft, and wherein at least two currently uppermost floors of the building cannot be reached by the elevator car after the conveying height is adjusted;

installing a construction elevator temporarily in a second elevator shaft in the currently uppermost region of the building and attaching the construction elevator to the climbing formwork platform, wherein the construction elevator includes a construction elevator frame, a construction elevator car vertically movable in the construction elevator frame, and at least two access openings arranged in the construction elevator frame and corresponding to adjacent shaft door clearances in a shaft wall of the second elevator shaft;

transporting people and/or material by the elevator system to a first floor in the building associated with one of the at least two access openings; and transporting the people and/or material from the first floor to a higher second floor in the currently uppermost region of the building or to the climbing formwork platform using the construction elevator.

2. The method according to claim 1 including hoisting the climbing formwork platform in steps each corresponding to a whole floor height.

3. The method according to claim 1 including using the elevator system during the construction phase of the building to transport people and/or material in a region of already inhabited or commercially used floors of the building, and after completion of the building leaving the elevator system permanently installed for use as a building elevator system.

4. The method according to claim 1 wherein a part of the construction elevator lying below the climbing formwork platform is high enough that a floor of the building currently adjacent to a lowermost one of the at least two access openings can be reached by the elevator car of the elevator system when the mechanical platform is temporarily positioned at a predetermined maximum vertical distance from the climbing formwork platform.

5. The method according to claim 1 wherein the construction elevator car has a conveying height that is in a range of four times to ten times an average floor height of the building.

6. The method according to claim 1 including steps of delivering the construction elevator to a construction site of the building as a unit preassembled in a manufacturing plant, lowering the unit into the second elevator shaft using a hoisting device, and attaching the unit to the climbing formwork platform of the climbing formwork device.

7. The method according to claim 1 wherein further access openings with assigned shaft doors are arranged on the construction elevator frame between a lowest one of the at least two access openings and an uppermost one of the at least two access openings.

8. The method according to claim 1 wherein the construction elevator is attached to the climbing formwork platform of the climbing formwork device such that an uppermost region of the construction elevator frame with an uppermost access opening and a top shaft door protrude upwards beyond the climbing formwork platform.

9. The method according to claim 1 wherein the construction elevator is attached to the climbing formwork platform of the climbing formwork device such that an entirety of construction elevator frame lies below the climbing formwork platform.

10. The method according to claim 1 wherein the construction elevator frame of the construction elevator extends at least over an entire conveying height of the construction elevator car, the construction elevator car is equipped with a first car door, a drive device for raising and lowering the construction elevator car is installed at the construction elevator frame, and the at least two access openings in a locking position of the climbing formwork device correspond to the shaft door clearances in the shaft wall of the second elevator shaft, wherein shaft doors that work together with the first car door of the construction elevator car are attached to the construction elevator frame to close off the shaft door clearances.

11. The method according to claim 10 wherein the at least two access openings and the shaft doors are arranged on the construction elevator frame such that levels of door sills of the shaft doors arranged below the climbing formwork platform match with levels of floors already constructed in the building when the climbing formwork device is in one of a plurality of predetermined locking positions, wherein at each of the locking positions another wall section of the building core is concreted with a wall section height corresponding to a floor height for the building.

12. The method according to claim 10 wherein at least one of the at least two access openings and an associated one of the shaft door are arranged on the construction elevator frame such a vertical position of the at least one access opening and the associated shaft door to be adjusted to different floor heights or to different distances between floor levels of the building.

13. The method according to claim 10 wherein the construction elevator is arranged in the second elevator shaft such that a first side of the construction elevator having the first car door and the shaft doors that work together with the first cabin door lie parallel to and adjacent to a first shaft wall of the second elevator shaft containing the shaft door clearances, wherein a second side of the construction elevator and a second shaft wall of the second elevator shaft parallel to the second side are spaced apart by at least 0.5 meters, wherein a second car door parallel to the second side of the construction elevator is attached to the construction elevator car and at least one access opening corresponding with the second car door and having an associated shaft door is attached to the construction elevator frame, and wherein, at a level of a door sill of the at least one shaft door corresponding to the second car door, in a space available between the second side of the construction elevator and the second shaft wall of the second elevator shaft parallel thereto, a walkable, horizontal platform is attached to the construction elevator frame, via which platform access to an interior of the second elevator shaft is possible from the construction elevator.

14. The method according to claim 10 wherein information about a current vertical position of the construction elevator is transmitted to a controller of the elevator system, and the controller evaluates the position information to determine a transfer floor to which both the elevator car and the construction elevator car can move as a transfer stop for moving the people and/or material between the elevator system and the construction elevator.

15. A construction site device adapted to perform the steps of the method according to claim 1 in a building during a construction phase of the building, the building including a plurality of floors that are built and the first elevator shaft that extends up to a current building height of the building, the device comprising:

the climbing formwork device including the climbing formwork platform arranged in the uppermost region of the building;

the elevator system installed in the first elevator shaft for transporting the people and/or material in a region of the floors that are built, the elevator system including the elevator car and the mechanical platform having the elevator drive machine for moving the elevator car, wherein at least the two uppermost floors are not accessible for the elevator car;

the construction elevator temporarily installed in the second elevator shaft and including the construction elevator frame forming a construction elevator shaft in which the construction elevator car is vertically movable and the at least two access openings corresponding to the shaft door clearances in the shaft wall of the second elevator shaft;

wherein the construction elevator is fixed to the climbing formwork platform, the people and/or material can be transported in the first step to the first floor by the elevator system, and the people and/or material can be transported in the second step to the second floor or to the climbing formwork platform by the construction elevator.

16. A method for vertical transportation of people and/or material in a building during a construction phase of the building, the method comprising the steps of:

arranging a climbing formwork device in a currently uppermost region of the building to concrete at least part of a building core of the building, the climbing formwork device including a climbing formwork platform and being adapted to be hoisted in steps;

installing an elevator system in a first elevator shaft of the building, the elevator system adapted to adjust to an increasing building height and having an elevator car, wherein a conveying height of the elevator system is intermittently adjusted to a current building height by hoisting a mechanical platform including an elevator drive machine to a higher level and fixing the mechanical platform in the first elevator shaft, and wherein at least two currently uppermost floors of the building cannot be reached by the elevator car after the conveying height is adjusted;

installing a construction elevator temporarily in a second elevator shaft in the currently uppermost region of the building and attaching the construction elevator to the climbing formwork platform, wherein the construction elevator includes a construction elevator frame, a construction elevator car vertically movable in the construction elevator frame, and at least two access openings arranged in the construction elevator frame and corresponding to adjacent shaft door clearances in a shaft wall of the second elevator shaft;

transporting people and/or material by the elevator system to a first floor in the building associated with one of the at least two access openings;

transporting the people and/or material from the first floor to a higher second floor in the currently uppermost region of the building or to the climbing formwork platform using the construction elevator; and wherein the construction elevator is attached to the climbing formwork platform of the climbing formwork device such that an uppermost region of the construction elevator frame with an uppermost access opening and a top shaft door protrude upwards beyond the climbing formwork platform.

17. A method for vertical transportation of people and/or material in a building during a construction phase of the building, the method comprising the steps of:

arranging a climbing formwork device in a currently uppermost region of the building to concrete at least part of a building core of the building, the climbing formwork device including a climbing formwork platform and being adapted to be hoisted in steps;

installing an elevator system in a first elevator shaft of the building, the elevator system adapted to adjust to an increasing building height and having an elevator car, wherein a conveying height of the elevator system is intermittently adjusted to a current building height by hoisting a mechanical platform including an elevator drive machine to a higher level and fixing the mechanical platform in the first elevator shaft, and wherein at least two currently uppermost floors of the building cannot be reached by the elevator car after the conveying height is adjusted;

installing a construction elevator temporarily in a second elevator shaft in the currently uppermost region of the building and attaching the construction elevator to the climbing formwork platform, wherein the construction elevator includes a construction elevator frame, a construction elevator car vertically movable in the construction elevator frame, and at least two access openings arranged in the construction elevator frame and corresponding to adjacent shaft door clearances in a shaft wall of the second elevator shaft;

transporting people and/or material by the elevator system to a first floor in the building associated with one of the at least two access openings;

transporting the people and/or material from the first floor to a higher second floor in the currently uppermost region of the building or to the climbing formwork platform using the construction elevator;

wherein the construction elevator frame of the construction elevator extends at least over an entire conveying height of the construction elevator car, the construction elevator car is equipped with a first car door, a drive device for raising and lowering the construction elevator car is installed at the construction elevator frame, and the at least two access openings in a locking position of the climbing formwork device correspond to the shaft door clearances in the shaft wall of the second elevator shaft, wherein shaft doors that work together with the first car door of the construction elevator car are attached to the construction elevator frame to close off the shaft door clearances; and wherein at least one of the at least two access openings and an associated one of the shaft door are arranged on the construction elevator frame such a vertical position of the at least one access opening and the associated shaft door to be adjusted to different floor heights or to different distances between floor levels of the building.

* * * * *